United States Patent
Widdowson et al.

(10) Patent No.: US 6,813,225 B2
(45) Date of Patent: Nov. 2, 2004

(54) LINEAR MOTOR DRIVEN MECHANISM USING FLEXURE BEARINGS FOR OPTO-MECHANICAL DEVICES

(75) Inventors: Gary Peter Widdowson, Kowloon (HK); Ajit Shriman Gaunekar, Kowloon (HK)

(73) Assignee: ASM Assembly Automation Limited, Kowloon (HK)

(*) Notice: Subject to any disclaimer, the term of this patent is extended or adjusted under 35 U.S.C. 154(b) by 481 days.

(21) Appl. No.: 09/931,942

(22) Filed: Aug. 20, 2001

(65) Prior Publication Data

US 2003/0035349 A1 Feb. 20, 2003

(51) Int. Cl.⁷ ................................................ G11B 7/00
(52) U.S. Cl. .............................. 369/44.15; 369/44.14; 369/44.16
(58) Field of Search ......................... 369/44.14, 44.15, 369/44.16, 44.19, 44.21, 44.22

(56) References Cited

U.S. PATENT DOCUMENTS

| | | | |
|---|---|---|---|
| 4,482,986 A | * 11/1984 | Noda et al. | 369/44.16 |
| 4,840,457 A | * 6/1989 | Remer | 369/44.15 |
| 4,862,441 A | * 8/1989 | Yumura et al. | 369/44.15 |
| 4,927,235 A | 5/1990 | Narumi | |
| 5,208,703 A | 5/1993 | Ikegame et al. | |
| 5,351,490 A | 10/1994 | Ohishi et al. | |
| 5,361,243 A | * 11/1994 | Kasahara | 369/44.15 |
| 5,492,313 A | 2/1996 | Pan et al. | |
| 5,493,546 A | * 2/1996 | Kasahara | 369/44.15 |
| 5,522,214 A | 6/1996 | Beckett et al. | |
| 5,594,820 A | 1/1997 | Garel-Jones et al. | |
| 5,647,217 A | 7/1997 | Penswick et al. | |
| 5,920,133 A | 7/1999 | Penswick et al. | |
| 6,050,556 A | 4/2000 | Masuda et al. | |
| 6,064,505 A | 5/2000 | Blanding | |
| 6,097,552 A | * 8/2000 | Gordon et al. | 369/44.15 |
| 6,129,527 A | 10/2000 | Donahoe et al. | |

* cited by examiner

Primary Examiner—W. R. Young
Assistant Examiner—Jorge L Ortiz Criado
(74) Attorney, Agent, or Firm—Burns, Doane, Swecker & Mathis, L.L.P.

(57) ABSTRACT

An apparatus for moving an optical element in an opto-mechanical system, includes at least one circularly symmetric flexure surrounding the optical element, and a device for moving the optical element along an axis perpendicular to and extending through the center of the flexure. A number of flexures may be provided in a stack with spacers therebetween, and the optical element may be mounted in a tubular member supported by two spaced apart stacks. Structure is also provided for damping end of movement vibrations.

10 Claims, 5 Drawing Sheets

LINEAR MOTOR DRIVEN MECHANISM USING FLEXURE BEARINGS FOR OPTO-MECHANICAL DEVICES

FIELD OF THE INVENTION

This invention relates to an apparatus for moving an element in an opto-mechanical system, and in particular for example to an apparatus for moving a lens in a lens focussing operation, for example for use in a wire bonding machine.

BACKGROUND OF THE INVENTION

Wire bonding machines and other apparatus used in the semiconductor manufacturing and assembly industry, often use a computerised vision system, for example for monitoring processes and for precise and accurate location of the position and orientation of objects such as semiconductor devices. Such vision systems include an opto-mechanical system for, in particular, moving optical elements such as a lens for the purpose of focussing operations.

PRIOR ART

Flexures are routinely used in opto-mechanical systems for manipulation of optical elements such as a mirror or a lens in focussing and tracking (U.S. Pat. Nos. 4,927,235, 5,208,703, 5,594,820, 6,064,505). Flexures are especially suited for these purposes due to the excellent inherent repeatability of their motion trajectory devoid of friction and wear. In many applications such as, for example, disc drives, a pair of flat parallel flexures similar to the ones shown in FIG. 1, are used. They closely mimic the classic four bar linkage. Thus, while the free end of each flexure moves along an arc, the rigid coupling between the flexures ensures that there is virtually no rotation at the free end. For a small displacement $\Delta x$, this approximates linear motion with a tolerably small parasitic motion $\Delta z$, perpendicular to the direction of the gross motion, but with virtually no lens tilt.

However, in some applications, such as in a computerized vision system of a wire bonding machine, both the orientation and the position of the optical axis of the moving lens have to be maintained within tight tolerances, over the entire range of lens motion. In such cases, parallel flexures mentioned above are not suitable. Flexures with circular symmetry do not suffer from parasitic lateral motion but instead, give rise to a small angular rotation about the motion axis. Such flexures have been used in long life compressors and cryogenic coolers as disclosed in U.S. Pat. Nos. 5,351,490, 5,492,313, 5,522,214, 5,647,217, 5,920,133, 6,050,556 and 6,129,527. Some typical designs are shown in FIG. 2. These are in the form of flat discs, fractions of a millimeter thick. Each disc has a specified number of slots (usually but not always, three), of either spiral or straight or arc shape or a combination thereof. They are machined using either wire electro-discharge machining or photo-lithography or any other suitable method, yielding a number of flexing "arms" which bear the load of the moving member. Very high ratios of radial stiffness to axial stiffness can be realized using such flexures.

Actuation of the mechanism using flexures of circular symmetry is normally effected by a brush-less linear motor using permanent magnets. The linear motor could be either of single phase (commonly called voice coil motor) or of multiphase design, in any of the several possible topologies but most usually cylindrical. While making best use of the available space, leading to a very compact design, the cylindrical voice coil motor keeps the actuating force virtually aligned with the axis of the flexure discs. A position sensor provides position feedback enabling the motor to be operated in closed loop servo mode for very precise control over the axial position of the optical component mounted on the moving member.

A problem associated with flexure bearings is the occurrence of self-excited vibrations at the end of the stroke. In the absence of sufficient damping in the system, these vibrations continue for an undesirably long period of time before their attenuation reaches a level acceptable to the specified objective of the motion stage, such as in the present case, moving a lens to focus an image of interest. This considerably slows down the entire process. In order to substantially speed up the attenuation of undesirable vibrations some kind of damping needs to be introduced into the system.

SUMMARY OF THE INVENTION

According to the present invention there is provided apparatus for moving an optical element in an opto-mechanical system, comprising at least one circularly symmetric flexure surrounding said optical element, and means for moving said optical element along an axis perpendicular to and extending through the centre of said at least one flexure.

Preferably there may be a stack of circularly symmetric flexures, and preferably the flexures in each said stack may be separated by spacer members. Such spacer members may include rim spacers for spacing apart rim portions of said flexures, and central spacers for spacing apart central portions of said spacers.

In a particularly preferred embodiment of the invention the optical element is mounted between two stacks of flexures and the axis of movement of the optical element extends perpendicular to and through the centre of each stack.

The means for moving the optical element may comprise a voice coil motor.

Means may be provided for sensing the position of said optical element and for providing a feedback control to said moving means. The sensing means may comprise a linear variable differential transducer, an optical sensor, a capacitive sensor or an inductive sensor.

Another preferred feature of the invention is that the optical element may be supported within a tubular member that moves with the optical element, such that an end of the tubular member is received within a bore formed as part of a fixed component, the bore having an internal diameter slightly greater than the external diameter of the tubular member to define a narrow annular passage therebetween, whereby movement of the optical element may be damped by the movement of air into and out of the bore through the annular passage.

BRIEF DESCRIPTION OF THE DRAWINGS

Some embodiments of the invention will now be described by way of example and with reference to the accompanying drawings, in whic.

DETAILED DESCRIPTION OF PREFERRED EMBODIMENTS

Figure 1:
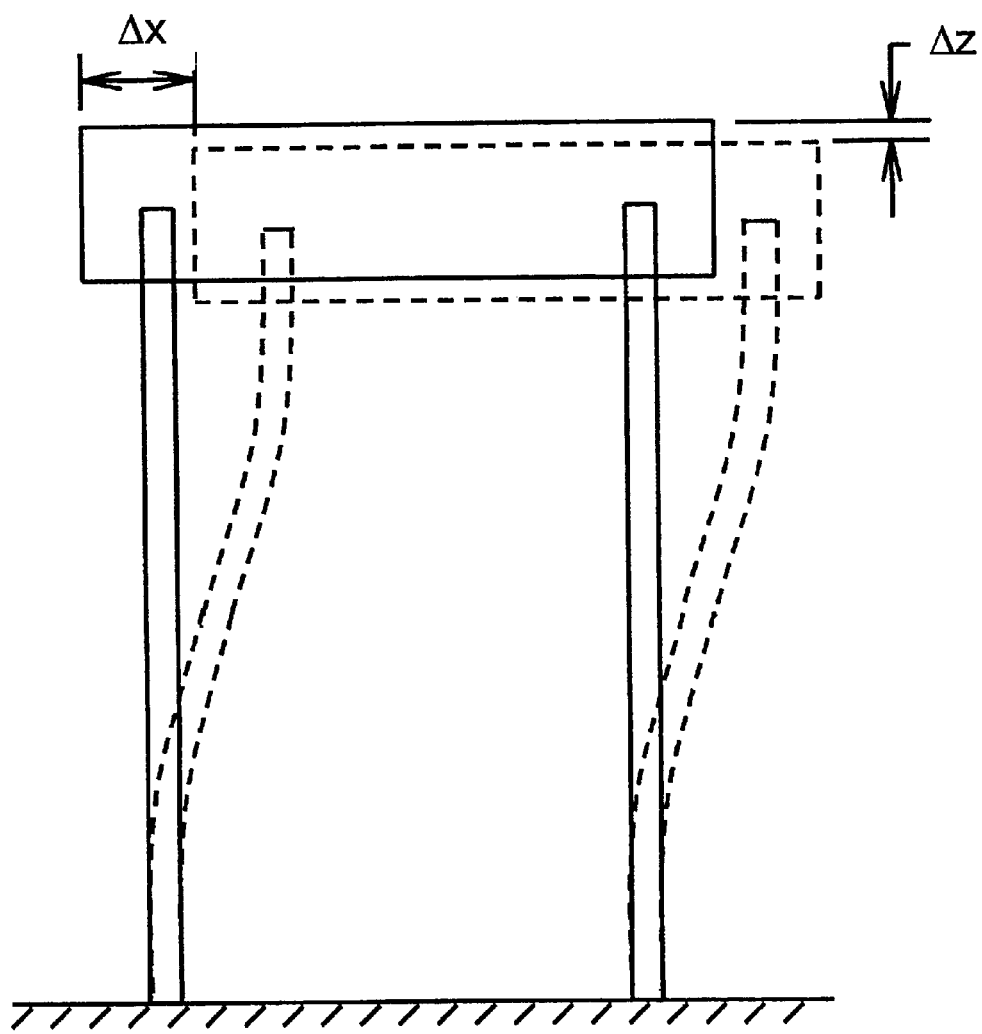
FIG. 1 shows an example of prior art relating to a pair of straight parallel flexures used for tilt free, approximately rectilinear motion.
Figure 2:
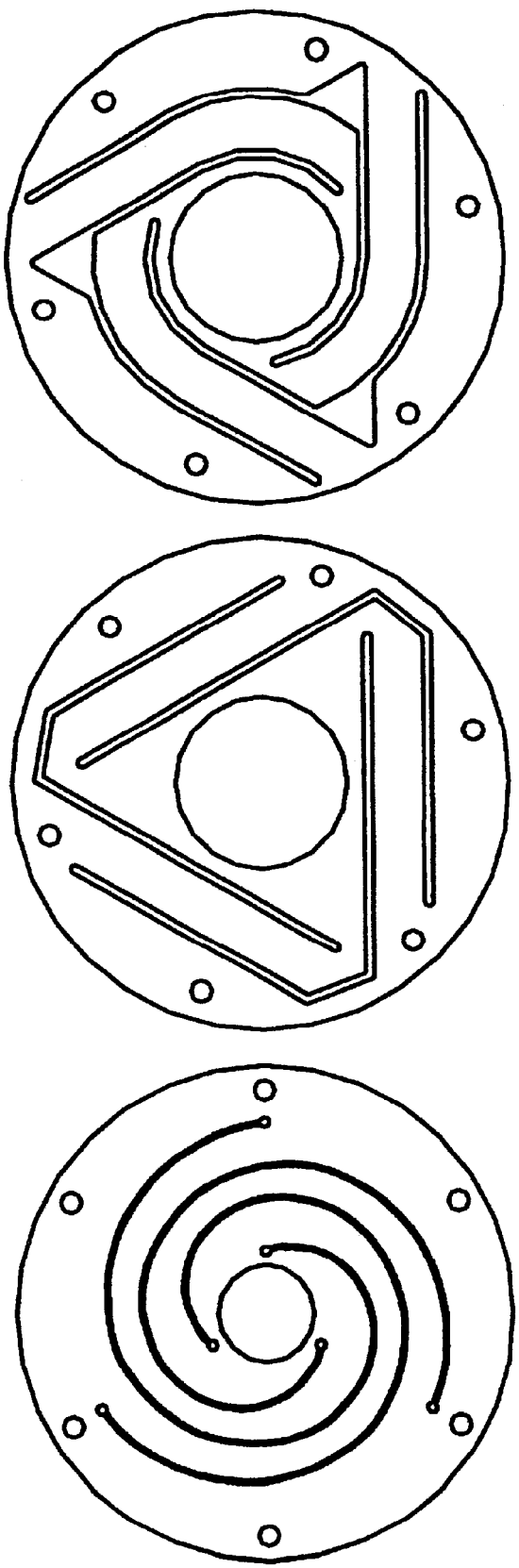
FIG. 2 shows three designs of flexures with circular symmetry.
Figure 3:
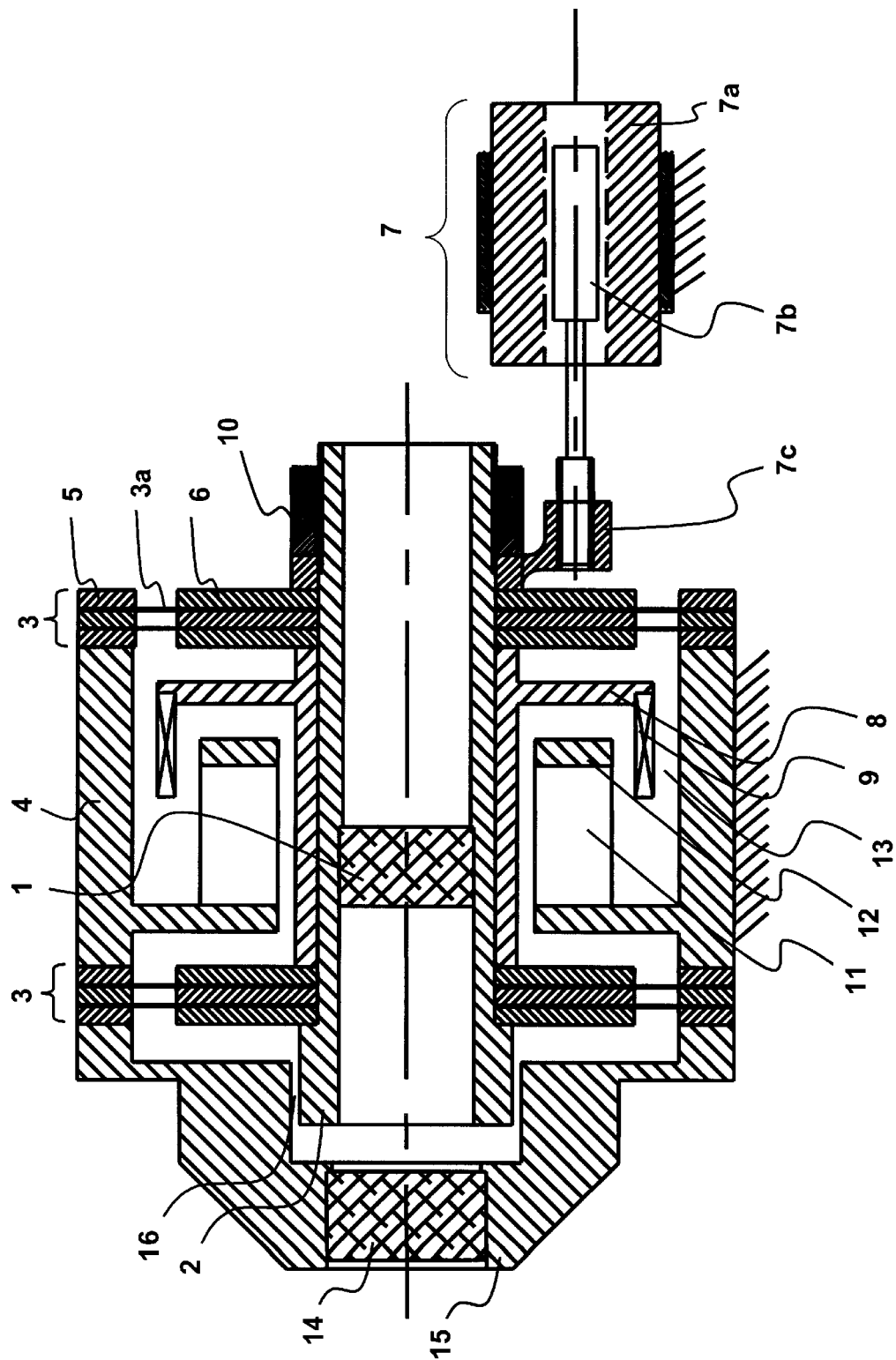
FIG. 3 shows a preferred embodiment of the present invention.

A preferred embodiment of the present invention will be described with reference to FIG. 3.

The moving optical component (henceforth referred to as "lens") 1, is suitably affixed inside the bore of a precisely machined tubular member 2 (henceforth called "tube"). The tube 2, is suspended from the main support 4, using stacks 3, of flat circular flexures 3a. Normally, two stacks 3, of flexures 3a, separated by a suitable distance are used. An LVDT (Linear Variable Differential Transducer) 7, consisting of a stationary coil assembly 7a, and a moving ferromagnetic core 7b, is used as a position sensor. Any other sensor such as a capacitive, inductive or optical sensor may be suitably used in place of the LVDT.

Figure 4:
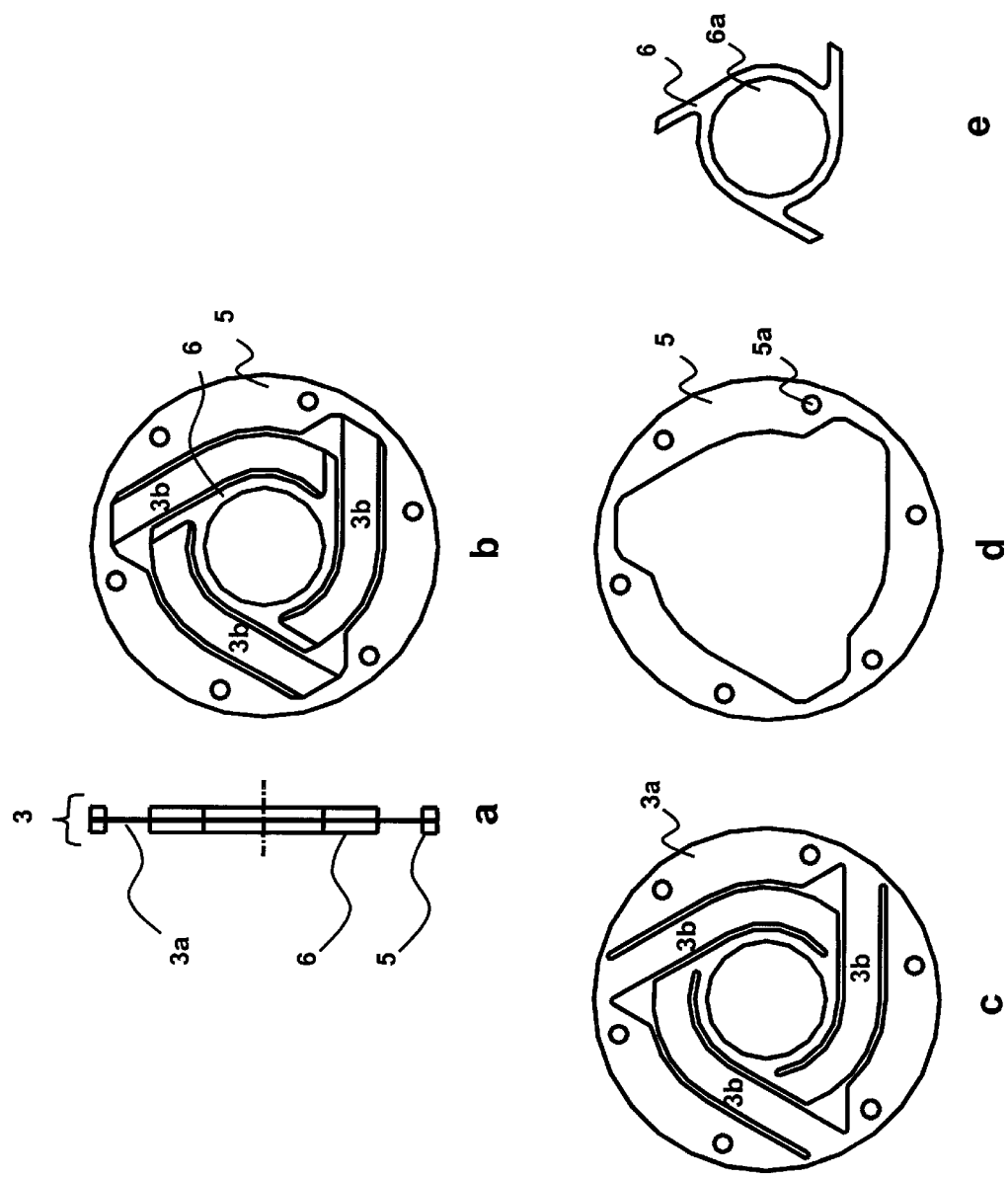
FIGS. 4a and 4b show two views of a flexure stack and FIGS. 4d and 4e show respectively a rim spacer and a central spacer to be used with the flexure shown in FIG. 4c, and FIGS. 5a and 5b show two views of another flexure stack
Figure 5:
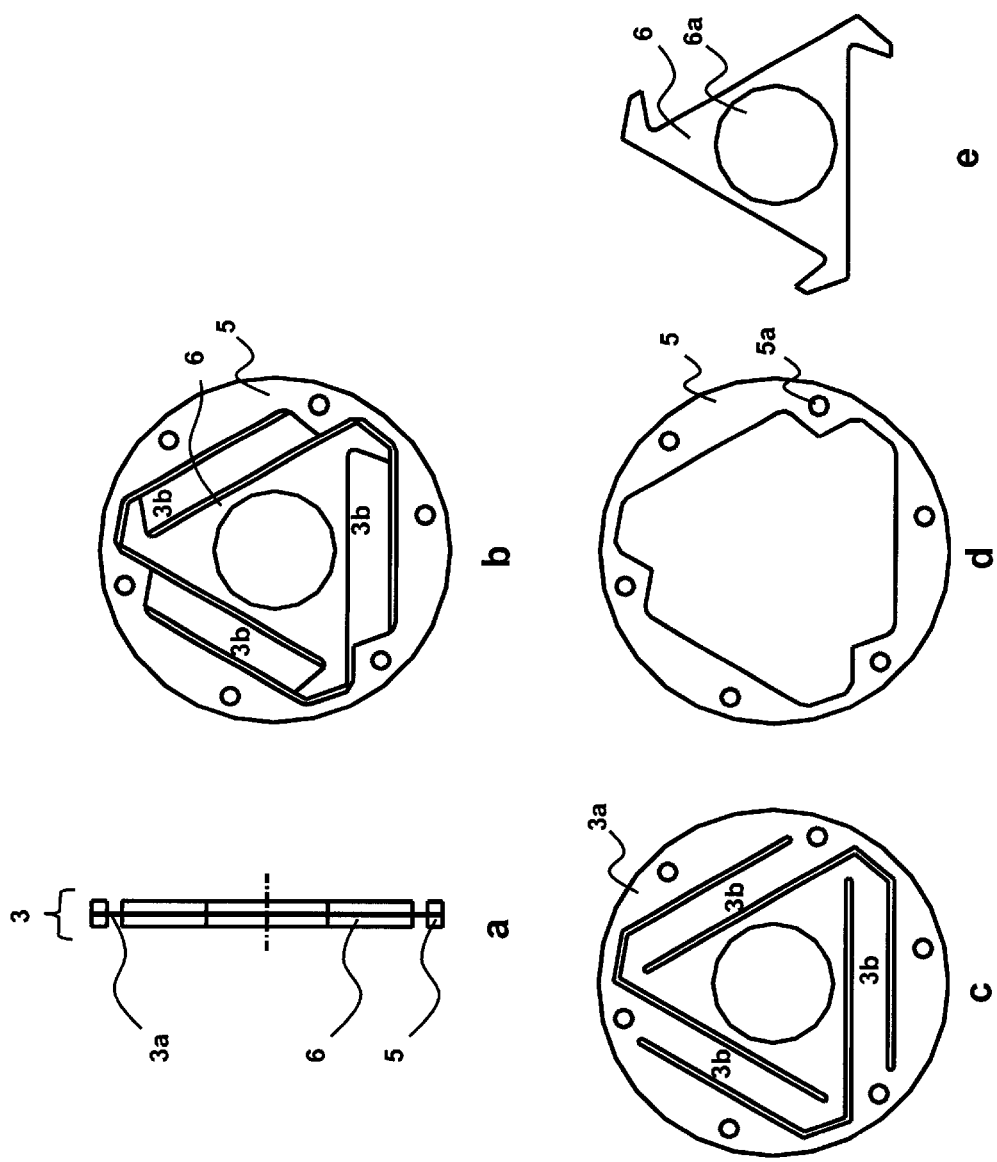
FIGS. 5d and 5e show respectively a rim spacer and a central spacer to be used with the flexure shown in FIG. 5c.

Two views of a flexure stack 3, are shown in FIGS. 4a and 4b, and its constituent parts are shown in FIGS. 4c, 4d and 4e. Two views of another flexure stack 3, are shown in FIGS. 5a and 5b, and its constituent parts are shown in FIGS. 5c, 5d and 5e. Each stack 3, consists of one or more flexures 3a, interspersed with spacers 5, 6. Each rim spacer 5, is shaped to cover that part of the flexure 3a, meant to be stationary. It has holes 5a, which are used to mount the stacks 3, on the main housing, 4. Each central spacer 6, has a hole 6a, which mates with the moving tube 2. It is shaped to cover that portion of the flexure 3a, which moves but does not flex. Those portions 3b, (henceforth called "flex-arms"), of the flexure disc 3a, that are not covered by any of the spacers 5, 6, can flex to yield the desired axial motion. The mutual coupling of the flex- arms 3b, within a flexure 3a, and also within different flexures 3a, in the stacks 3, imparts a very high radial stiffness to the entire assembly, while keeping the axial stiffness relatively low.

Referring back to FIG. 3, the flexure stacks are spaced apart by the coil mount 8, of the voice coil 9, in the moving section and by the main support 4, in the stationary section. The moving core 7b, of the LVDT 7, is then mounted on the moving tube 1, via core mount 7c, and the whole moving sub-assembly is clamped tight using nut, 10. The LVDT core 7b, is ensured to be nominally co-axial with the LVDT coil assembly 7a.

An axially magnetized permanent magnet 11, in the shape of a ring is glued into the main housing 4. The permanent magnet 11, is made of a high energy density material such as neodymium ferrous boron. A ring shaped pole piece 12, of magnetically permeable iron alloy, is glued on the magnet. The main housing 4, which is also made from magnetically permeable iron alloy, acts as the outer pole. Thus the annular air gap 13, between the inner pole piece 12, and the main housing 4, contains a radial magnetic field. When the coil 9, appropriately positioned in the magnetic air gap 13, is energized by an electrical current, an axial force is induced on it. When the direction of the current is reversed, the force on the coil is also reversed. The above described voice coil motor is thus used to move and position the tube 2, and the lens 1, contained in the tube 2. Alternative topologies of a voice coil motor or a multiphase linear motor may be used in place of the voice coil motor described above Another lens 14, meant to be stationary, is affixed inside a precisely machined bore of the lens mount 15. The bore of the lens mount 15, is accurately sized such that when assembled properly, the moving tube 2, enters inside it without touching it. In other words, there exists a very small annular gap 16, of the order of 10–20 micrometers, between the outer cylindrical surface of the moving tube 2, and the inner cylindrical surface of the bore in the stationary lens mount 15. Firstly, this ensures that the stationary lens 14, is adequately co-axial with the moving lens 1, thus facilitating proper optical function. Secondly, this simple arrangement also introduces desired damping in the system as follows. When the moving tube 2, moves towards the stationary lens 14, the air trapped in between the two lenses 1 and 14, is compressed. The rise in air pressure above ambient, drives out the air through the narrow annular gap between the moving tube 2, and the stationary lens mount 15. The friction generated during the passage of air leads to damping. When the moving tube 2, moves away from the stationary lens 14, the air trapped in between the two lenses 1 and 14, is expanded leading to reduced pressure. This forces air from the ambient into the space between the lenses 1 and 14, leading to friction damping as explained above. Thus any motion of the moving tube leads to flow of air either into or away from the space enclosed between the lenses 1 and 14, leading to friction damping in proportion to the velocity of the tube. This helps in speeding up the attenuation of the vibration at the end of each stroke, reducing the settling time and speeding up overall operation.

It will thus be seen that, at least in its preferred forms, the present invention provides a mechanism for moving an optical component such as a lens using flexure bearings, for use in a wire bonding machine in particular and also in other machines in general. The mechanism is intended to achieve straight line motion of a lens relative to another co-axial lens thus yielding a means whereby the focus of the optical assembly can be altered without manual intervention. The moving part of the mechanism is actuated by a voice coil motor in such a way, that the effective actuating force is nominally co-axial with the moving lens.

Another object of the present invention is to provide a simple method of damping down undesirable vibrations of the mechanism at the end of its stroke thus facilitating faster operation. The principle features of the present invention may be employed in various embodiments not covered herein, without departing from the scope of the invention.

What is claimed is:

1. Apparatus for moving an optical element in an opto-mechanical system, comprising a flexure stack coupled to said optical element, wherein the flexure stack includes at least one circularly symmetric flexure, rim spacers on opposite planar surfaces of the flexure for covering a rim portion of the flexure and central spacers on opposite planar surfaces of the flexure for covering a central portion of the flexure, and means for moving said optical element along an axis perpendicular to and extending through the center of said at least one flexure.

2. Apparatus as claimed in claim 1 including a plurality of circularly symmetric flexures in the flexure stack.

3. Apparatus as claimed in claim 2 wherein the flexures in each said stack are separated by spacer members.

4. Apparatus as claimed in claim 3 wherein said spacer members include rim spacers for spacing apart rim portions of said flexures, and central spacers for spacing apart central portions of said flexures.

5. Apparatus as claimed in claim 1 wherein said optical element is mounted between two said stacks of flexures such that the stacks are at opposite sides of the means for moving said optical element and wherein said axis of movement of said optical element extends perpendicular to and through the center of each said stack.

6. Apparatus as claimed in claim 1 wherein said means for moving said optical element comprises a voice coil motor.

7. Apparatus as claimed in claim 1 comprising means for sensing the position of said optical element and means for providing a feedback control to said moving means.

8. Apparatus as claimed in claim 7 wherein said sensing means is selected from the group consisting of a linear variable differential transducer, an optical sensor, a capacitive sensor and an inductive sensor.

9. Apparatus as claimed in claim 1 wherein said optical element is a lens adapted to move relative to a fixed lens.

10. Apparatus as claimed in claim 1 wherein said optical element is supported within a tubular member and said tubular member moves with said optical element, wherein an end of said tubular member is received within a bore formed as part of a fixed component, said bore having an internal diameter slightly greater than the external diameter of said tubular member to define a narrow annular passage therebetween, whereby movement of the optical element may be damped by the movement of air into and out of said bore through said annular passage.

* * * * *